United States Patent
Kim et al.

(10) Patent No.: US 7,225,128 B2
(45) Date of Patent: May 29, 2007

(54) SYSTEM AND METHOD FOR PROVIDING INFORMATION USING SPOKEN DIALOGUE INTERFACE

(75) Inventors: Jeong-su Kim, Kyungki-do (KR); Yong-beom Lee, Kyungki-do (KR); Jae-won Lee, Seoul (KR); Hye-jeong Lee, Seoul (KR); Chan-min Park, Kyungki-do (KR); Hee-kyoung Seo, Kyungki-do (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 849 days.

(21) Appl. No.: 10/401,695

(22) Filed: Mar. 31, 2003

(65) Prior Publication Data

US 2003/0220799 A1  Nov. 27, 2003

(30) Foreign Application Priority Data

Mar. 29, 2002  (KR) ...................... 10-2002-0017413

(51) Int. Cl.
*G10L 15/00* (2006.01)
(52) U.S. Cl. .................. 704/257; 704/258; 704/7; 704/260; 704/275
(58) Field of Classification Search .................. 704/9, 704/275, 257, 260, 235, 258, 270.1, 1
See application file for complete search history.

(56) References Cited

U.S. PATENT DOCUMENTS 5,577,164 A * 11/1996 Kaneko et al. ............. 704/275
5,615,296 A *  3/1997 Stanford et al. ......... 704/270.1
5,644,774 A *  7/1997 Fukumochi et al. ........... 704/4
5,652,828 A *  7/1997 Silverman .................... 704/260
5,682,539 A * 10/1997 Conrad et al. ................. 704/9
5,761,637 A *  6/1998 Chino ........................ 704/231
5,797,116 A *  8/1998 Yamada et al. ............... 704/10
6,282,507 B1   8/2001 Horiguchi et al.

(Continued)

OTHER PUBLICATIONS

European Search Report issued by the European Patent Office on Jan. 17, 2005 in corresponding application EP 03 25 1975.

(Continued)

*Primary Examiner*—Vijay Chawan
(74) *Attorney, Agent, or Firm*—Buchanan Ingersoll & Rooney PC

(57) ABSTRACT

There are provided a system and method for providing information using a spoken dialogue interface. The system includes a speech recognizer for transforming voice signals into sentences; a sentence analyzer for analyzing the sentences by their structural elements; a dialogue manager for extracting information on speech acts or intentions from the structural elements, and generating information on system's speech acts or intentions for a response to the extracted information on speech acts or intentions; a sentence generator for generating sentences based on the information on the system's speech acts or intentions for the response; a speech synthesizer for synthesizing the generated sentences into voices; an information extractor for extracting information required for the response from the Internet in real time; and a user modeling means for analyzing and classifying users' tendencies. Information demanded by a user can be detected in real time and provided through a voice interface with versatile and familiar dialogues based on the user's tendencies.

15 Claims, 4 Drawing Sheets

U.S. PATENT DOCUMENTS

| | | | |
|---|---|---|---|
| 6,442,524 B1 * | 8/2002 | Ecker et al. | 704/277 |
| 6,647,363 B2 * | 11/2003 | Claassen | 704/1 |
| 6,745,161 B1 * | 6/2004 | Arnold et al. | 704/7 |
| 6,920,420 B2 * | 7/2005 | Lin | 704/9 |
| 2002/0032564 A1 | 3/2002 | Ehsani et al. | |

OTHER PUBLICATIONS

Hiroya Murao, et al., "Example-Based Query Generation for Spontaneous Speech," 2001 IEEE Workshop on Automatic Speech Recognition and Understanding, Conference Proceedings, Dec. 9, 2001, pp. 268-271.

* cited by examiner

SYSTEM AND METHOD FOR PROVIDING INFORMATION USING SPOKEN DIALOGUE INTERFACE

BACKGROUND OF THE INVENTION

This application claims the priority of Korean Patent Application No. 2002-17413, filed on Mar. 29, 2002, in the Korean Intellectual Property Office, the disclosure of which is incorporated herein in its entirety by reference.

1. Field of the Invention

The present invention relates to a conversational agent for interfacing a human and a machine. Particularly, the present invention relates to a system for providing information in voice signals, which allow versatile dialogues by utilizing a knowledge database system that can extract wanted information in real time from the Internet and store users' dialogue records and tendencies, and a number of dialogue cases. Further, the present invention relates to a method of providing information in voice signals.

2. Description of the Related Art

In conventional methods of providing information in voice signals, dialogues have been managed by controlling the state transition control between a user state and a system state based on the detection of a keyword, or through a dialogue manager using scripts to determine system behaviors, and a knowledge database for managing the dialogues has been built on an off-line basis. Since information has not been updated in real time, there has been a limit in the provision of information. Further, since only short-term dialogues have been used and very limited and almost similar dialogues have been repeated, interests in the system for providing information in voice signals have not been sustained, and therefore, the application of the system has been limited.

SUMMARY OF THE INVENTION

The present invention provides a system and method for providing information using a spoken dialogue interface, which analyzes a user's voice signals and provides information in voice signals in response to the user's voice signals.

Further, the present invention provides a computer readable recording medium on which a program to implement the above-described method is embedded.

According to an aspect of the present invention, there is provided a system for providing information using a spoken dialogue interface, which includes a speech recognizer for transforming voice signals into sentences; a sentence analyzer for analyzing the sentences by their structural elements; a dialogue manager for extracting information on speech acts or intentions from the structural elements and generating information on system's speech acts or intentions for a response to the extracted information on speech acts or intentions; a sentence generator for generating sentences based on the information on system's speech acts or intentions for the response; a speech synthesizer for synthesizing the generated sentences into voices; an information extractor for extracting information required for the response from the Internet in real time; and a user modeling means for analyzing and classifying users' tendencies.

According to another aspect of the present invention, there is provided a method of providing information using a spoken dialogue interface, which includes the steps of (a) transforming voice signals into sentences; (b) analyzing the sentences by their structural elements; (c) extracting information on speech acts or intentions from the structural elements and generating information on system's speech acts or intentions for a response to the extracted information on speech acts or intentions; (d) generating sentences based on the information on system's speech acts or intentions for the response; and (e) synthesizing the generated sentences into voices.

BRIEF DESCRIPTION OF THE DRAWINGS

The above aspects and advantages of the present invention will become more apparent by describing, in detail, preferred embodiments thereof with reference to the attached drawings in which.

DETAILED DESCRIPTION OF THE INVENTION

Figure 1:
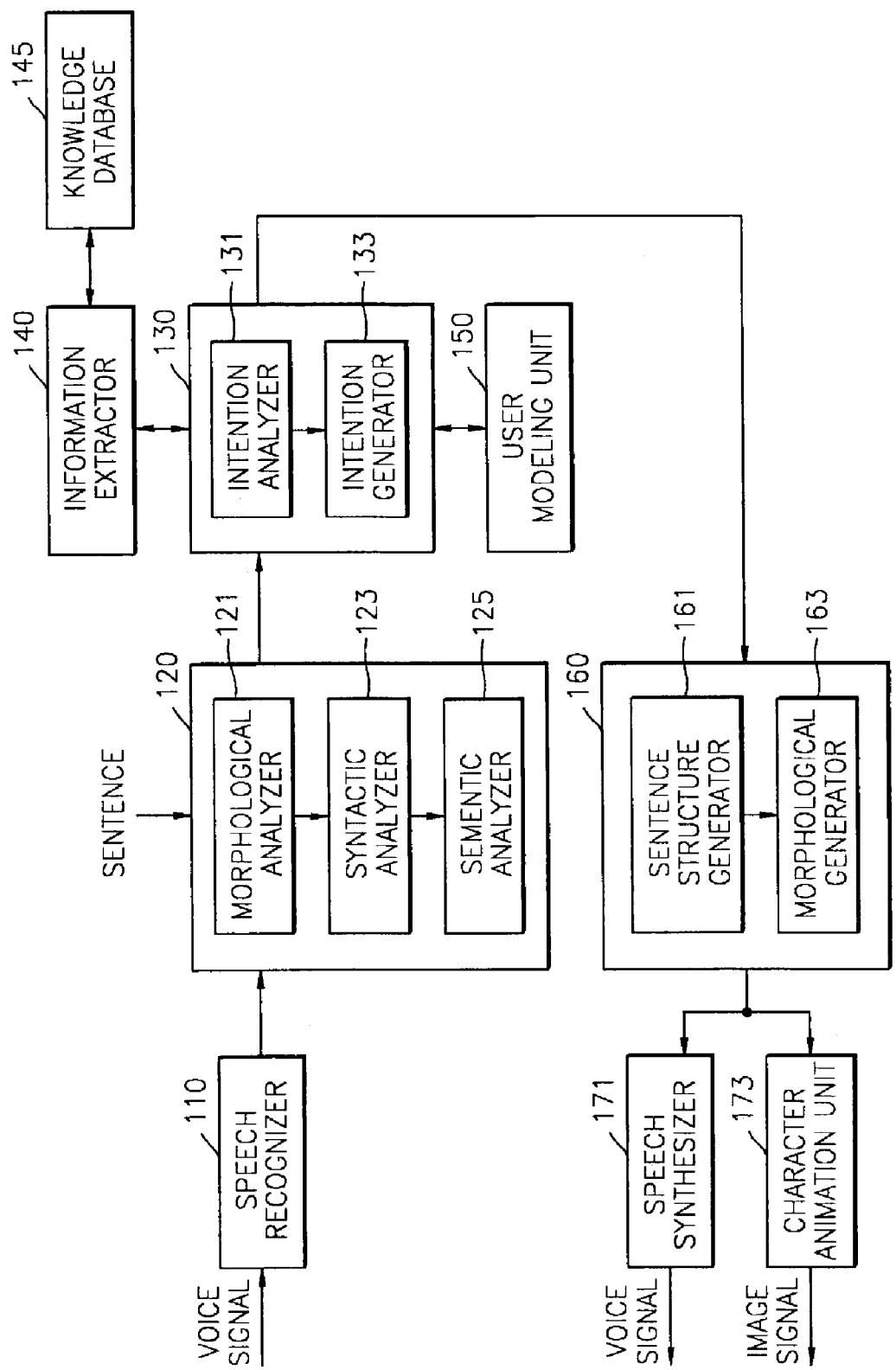
FIG. 1 is a block diagram of a system for providing information using a spoken dialogue interface, according to a preferred embodiment of the present invention.
Figure 2:
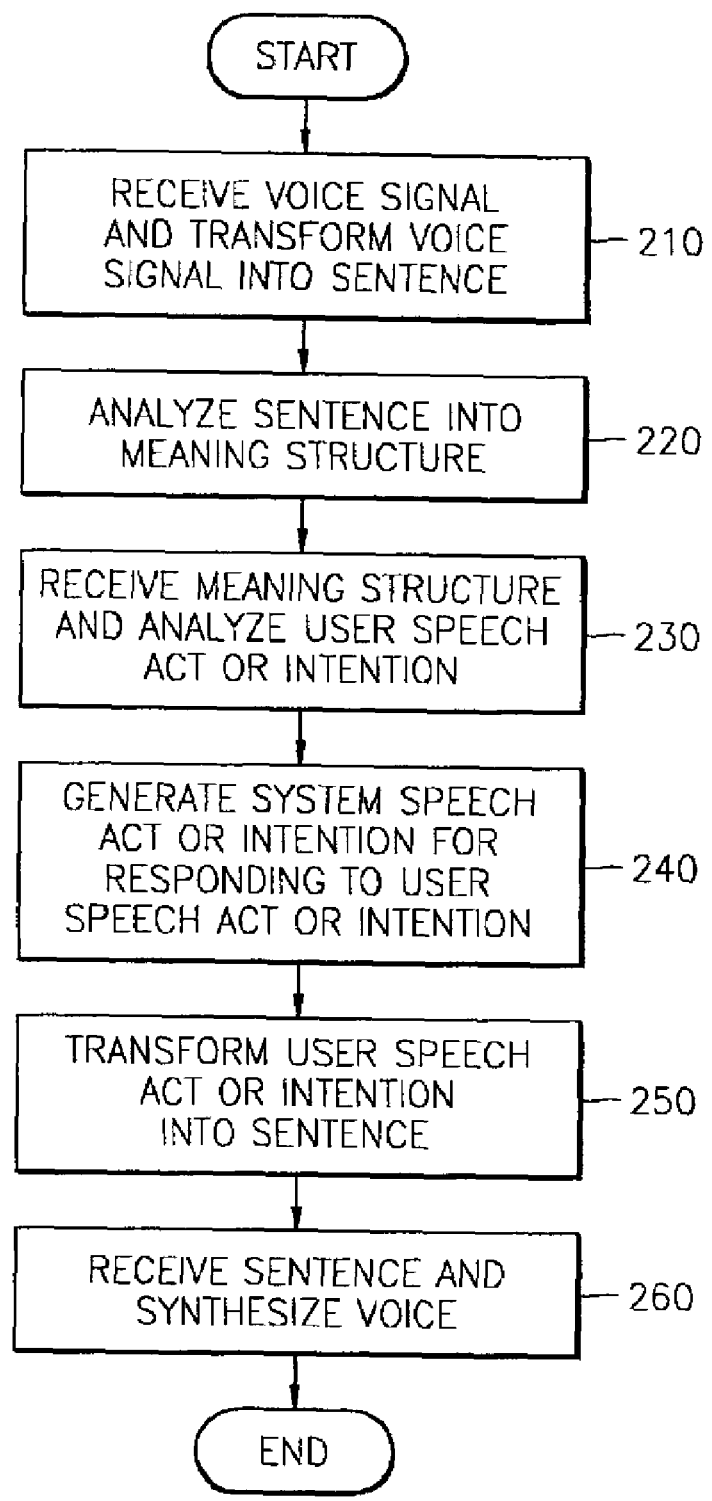
FIG. 2 is a flowchart of a method of providing information using a spoken dialogue interface, according to a preferred embodiment of the present invention.

A preferred embodiment of the present invention will now be described with reference to FIGS. 1 and 2. FIG. 1 is a block diagram of a system for providing information using a voice dialogue interface, according to a preferred embodiment of the present invention, and FIG. 2 is a flowchart of a method of providing information using a voice dialogue interface, according to a preferred embodiment of the present invention.

When a user transmits voice signals, a speech recognizer 110 receives the voice signals, recognizes voices, and transforms the voice signals into sentences (STEP 210). A sentence analyzer 120 receives the sentences transformed through the speech recognizer 110 or sentences input through an input device such as a keyboard, and analyzes the sentences by their meaning structures (STEP 220). The sentence analyzer 120 includes a morphological analyzer 121 for separating the input sentences into morphemes and tagging the separated morphemes, a syntactic analyzer 123 for analyzing the structural elements of a sentence based on the relationship between the morphemes, and a semantic analyzer 125 for determining the meanings of the structural elements of a sentence and transforming them into meaning structures.

A dialogue manager 130 includes an intention analyzer 131 and an intention generator 133. The intention analyzer 131 receives the meaning structures and anlayzes the type of speech act or intention, among asking, demanding, proposing, requesting, etc., that is included in the user's voice signals (STEP 230). The intention generator 133 generates a system speech act or intention, such as answering, refusing, or accepting, for a response to the anlayzed user's speech act or intention (STEP 240). An information extractor 140 receives query information, and provides the intention generator 133 with information corresponding to the query information by searching for on-line information from the Internet or another network and off-line information from a knowledge database 145. A user modeling unit 150 receives information on the user's dialogues from the intention analyzer 131, analyzes the user's tendencies, and provides the analyzed result to the intention generator 133. The knowledge database 145 stores the records of dialogues between the user and the system, and the user's tendencies.

A sentence generator 160 receives information on system's speech acts or intentions, and transforms the information on system's speech acts or intentions into sentences (STEP 250). The sentence generator 160 includes a sentence structure generator 161 for generating sentence structures from the meaning structures regarding the system's speech acts or intentions, and a morphological generator 163 for receiving the sentence structures and generating morphemes to transform the sentence structures into sentences. A speech synthesizer 171 receives the sentences, synthesizes the sentences into voices, and outputs the synthesized voices (STEP 260). A character animation unit 173 receives the sentences and outputs motion pictures so that the user is inclined to communicate with a character in the motion pictures while the user is obtaining information.

Figure 3:
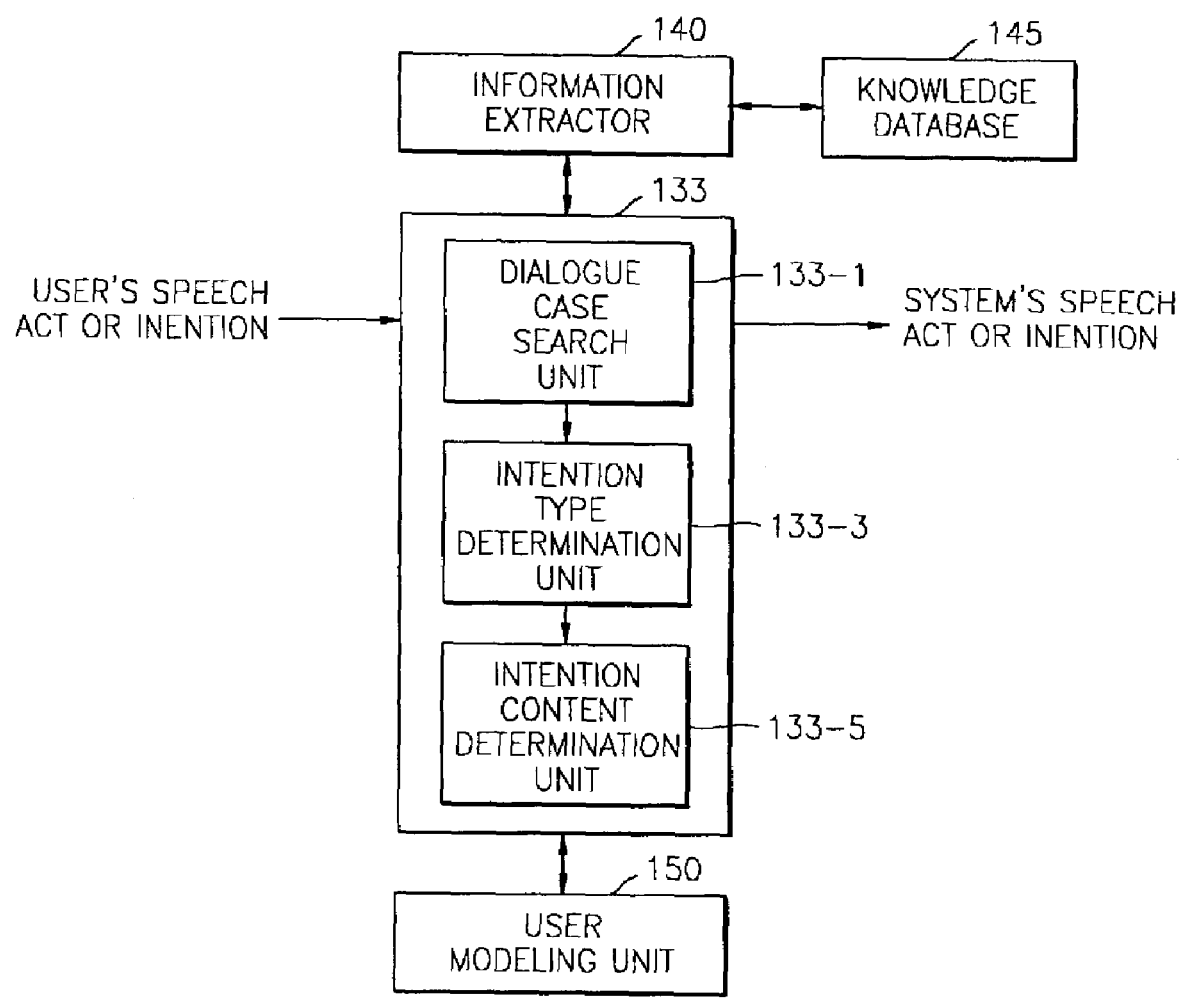
FIG. 3 is a more detailed block diagram of the intention generator shown in FIG. 1.
Figure 4:
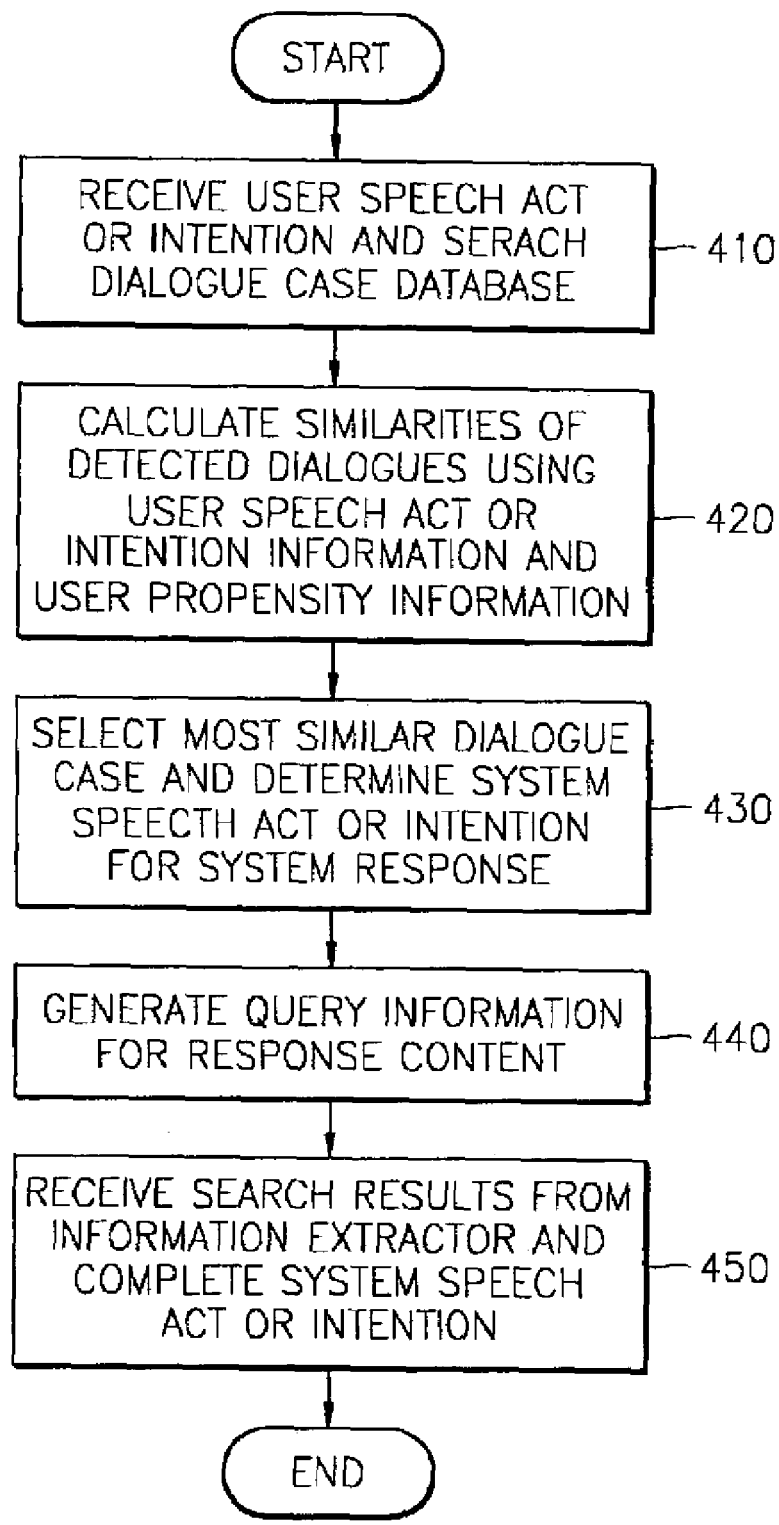
FIG. 4 is a flowchart for explaining operations of the intention generator shown in FIG. 3.

The intention generator 133 will now be described in more detail with reference to FIGS. 3 and 4. FIG. 3 is a more detailed block diagram of the intention generator 133 shown in FIG. 1, and FIG. 4 is a flowchart for explaining operations of the intention generator 133 shown in FIG. 3.

The intention generator 133 includes a dialogue case search unit 133-1, an intention type determination unit 133-3, and an intention content determination unit 133-5. The dialogue case search unit 133-1 receives information on the user's speech acts and intentions, and searches for multiple dialogue cases from a dialogue case database (STEP 410). The intention type determination unit 133-3 calculates similarities between the information on the user's speech acts or intentions and the dialogue cases using information on the user's tendencies (STEP 420), and selects the most similar dialogue and determines a system's speech act or intention type for a system response (STEP 430). The intention content determination unit 133-5 generates query information to complete the content portion of the selected intention type (STEP 440) and completes the information on the system's speech acts or intentions using the search results from the Information extractor 170 (STEP 450). The dialogue case has a format where the user's intentions and the system's intentions correspond with one another and the dialogue case database stores a number of dialogue cases.

The present invention can be implemented on a recording medium with a code that is readable by a computer. The recording medium that can be read by a computer may include any kind of recording devices in which data that is readable by the computer is stored. Examples of the recording medium include ROM, RAM, CD-ROM, magnetic tape, hard discs, floppy discs, flash memory, optical data storage devices, and even carrier waves, for example, transmission over the Internet. Moreover, the recording medium may be distributed among computer systems that are interconnected through a network, and the present invention may be stored and implemented as a code in the distributed system.

As described above, according to the present invention, information demanded by a user can be detected in real time and provided through a voice interface with versatile and familiar dialogues based on the user's tendencies. That is, as the records of dialogues with a user are stored and an adequate response to a query is provided, it is possible to hold the user's interest without repeating similar dialogues. Further, since a knowledge database can be built in real time, information can be updated and provided in real time.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A system for providing information using a spoken dialogue interface, comprising:
   a speech recognizer for transforming voice signals into sentences;
   a sentence analyzer for analyzing the sentences by their meaning structures;
   a dialogue manager for extracting information on user speech acts or intentions from the meaning structures and generating information on system speech acts or intentions for a response to the extracted information on the user's speech acts or intentions;
   a sentence generator for generating sentences based on the information on the system's speech acts or intentions for the response to the voice signals; and
   a speech synthesizer for synthesizing the generated sentences into voices.

2. The system of claim 1, wherein the sentence analyzer includes a morphological analyzer for separating the sentences into their morphemes and tagging the separated morphemes and a syntactic analyzer for analyzing sentence structural elements based on relationships between the morphemes.

3. The system of claim 1, wherein the sentence analyzer further includes a semantic analyzer for transforming the sentences transformed from the voice signals into the meaning structures.

4. The system of claim 1, wherein the dialogue manager includes an intention analyzer for determining the user's speech acts or intentions from the meaning structures, and an intention generator for generating the system's speech acts or intentions for a response to the user's speech acts or intentions.

5. The system of claim 1, further comprising a query generator for generating query information based on information on the user's speech acts or intentions.

6. The system of claim 5, further comprising an information extractor for extracting information using the query information as key words and a user modeling means for modeling the user's tendencies from the user's dialogues.

7. The system of claim 1, further comprising a knowledge database for storing the information on the user's speech acts or intentions extracted from the meaning structures, and the information on the system's speech acts or intentions.

8. The system of claim 1, wherein the sentence generator includes a sentence structure generator for receiving the information on the system's speech acts or intentions and generating sentence structures and a morpheme generator for receiving the sentence structures and generating morphemes.

9. A method of providing information using a spoken dialogue interface, comprising the steps of:
   (a) transforming voice signals into sentences;
   (b) analyzing the sentences by their meaning structures;
   (c) extracting information on user speech acts or intentions from the meaning structures, and generating information on system speech acts or intentions for a response to the extracted information on the user's speech acts or intentions;
   (d) generating sentences based on the information on the system's speech acts or intentions for the response to the voice signals; and
   (e) synthesizing the generated sentences into voices.

10. The method for claim 9, wherein step (b) includes (b1) separating the sentences into their morphemes and tagging the separated morphemes and (b2) analyzing structural elements of a sentence based on relationships between the morphemes.

11. The method of claim 9, wherein the step (c) includes (c1) determining the user's speech acts or intentions from the meaning structures, (c2) searching through a dialogue case database based on information on the user's speech acts or intentions, (c3) calculating similarities of the detected dialogue cases using information on the user's speech acts or intentions and information on the user's tendencies, (c4) selecting the most similar dialogue case using information on the similarities and determining the system's speech acts or intentions for a system response, (c5) generating query information for a response, and (c6) receiving search results obtained through the query information and completing the system's speech acts or intentions.

12. The method of claim 9, wherein the step (b) includes transforming the sentences transformed from the voice signals into the meaning structures.

13. The method of claim 9, wherein the step (c) includes storing the information on the user's speech acts or intentions extracted from the meaning structures.

14. The method of claim 9, wherein step (d) includes (d1) generating sentence structures based on the information on the system's speech acts or intentions and (d2) generating morphemes for a response.

15. A computer readable recording medium that stores a program for the computer to implement the method claimed in claim 9.

* * * * *